United States Patent [19]

Webster et al.

[11] Patent Number: 5,269,926
[45] Date of Patent: Dec. 14, 1993

[54] SUPPORTED MICROPOROUS CERAMIC MEMBRANES

[75] Inventors: Elizabeth Webster; Marc Anderson, both of Madison, Wis.

[73] Assignee: Wisconsin Alumni Research Foundation, Madison, Wis.

[21] Appl. No.: 756,395

[22] Filed: Sep. 9, 1991

[51] Int. Cl.$^5$ ............................................. B01D 63/00
[52] U.S. Cl. ...................... 210/500.25; 210/500.26; 210/510.1; 427/230; 427/244; 427/246
[58] Field of Search ............. 427/244, 246, 230; 210/500.25, 500.26, 510.1

[56] References Cited

U.S. PATENT DOCUMENTS

| | | | |
|---|---|---|---|
| 4,784,880 | 4/1988 | Coplan et al. | 427/245 |
| 5,006,248 | 4/1991 | Anderson et al. | 210/500.25 |
| 5,028,568 | 7/1991 | Anderson et al. | 501/12 |
| 5,035,784 | 7/1991 | Anderson et al. | 210/748 X |

OTHER PUBLICATIONS

Anderson, Marc A. et al, "Titania and Alumina Ceramic Membranes," Journal of Membrane Science, 39, 1988, pp. 243-258.

Coplan, Myron J., "Endo treating: A New Approach to Composite Membranes", Eighth Annual Membrane Technology Planning Conference, Oct. 15-17, 1990, pp. 1-16.

*Primary Examiner*—Michael Lusignan
*Attorney, Agent, or Firm*—Quarles & Brady

[57] ABSTRACT

A method for permformation of microporous ceramic membranes onto a porous support includes placing a colloidal suspension of metal or metal oxide particles on one side of the porous support and exposing the other side of the porous support to a drying stream of gas or a reactive gas stream so that the particles are deposited on the drying side of the support as a gel. The gel so deposited can be sintered to form a supported ceramic membrane useful for ultrafiltration, reverse osmosis, or molecular sieving having mean pore sizes less than 100 Angstroms.

29 Claims, 3 Drawing Sheets

SUPPORTED MICROPOROUS CERAMIC MEMBRANES

STATEMENT REGARDING FEDERALLY SPONSORED RESEARCH

This invention was made with United States government support awarded by the Department of Energy (DOE), Grant # DE-FC07-88ID12778. The United States Government has certain rights in this invention.

FIELD OF THE INVENTION

The present invention relates to the general field of porous ceramic membranes and relates, in particular, to a method for creating microporous supported ceramic membranes and the products produced by the method.

BACKGROUND OF THE INVENTION

Porous ceramic membranes are durable inorganic film materials having a porous quality. On a microscopic level, the materials may be conceptualized as a series of generally uniform spherical particles which are arranged in a close packing model, with the junction points between the spherical particles being fused together. The result is a durable inorganic, homogenous, amorphous to crystalline material which has a relatively uniform distribution of pores, with the pores being determined by the size of the particles forming up the membrane. The smaller the size of the particles, the smaller the holes left between them, when the particles are packed together and fused.

The nature of the material results from the general procedure for making such membranes. The general approach to the manufacture of such membranes consists of a sol-gel process. In the sol part of the process, a dilute colloidal solution or suspension of metal oxide particles is created, typically by hydrolysis of a metal alkoxide or metal salt. Care must be taken at this stage to prevent accretion of large particles, if a small pore size is desired in the membrane. Then, under very tightly controlled conditions, the solvent is removed from the solution, resulting in a semisolid phase of material known as a xerogel or gel. The gel is typically a translucent or transparent semi-solid material which will retain its shape, but is still relatively deformable. Upon completion of the removal of the solvent and sintering of the gel, a durable hard ceramic material is created. There must be limitations on the heat of the sintering process, since too high a temperature will destroy the pores, but within a wide range, a porous ceramic material can be created as a supported or as an unsupported membrane.

Certain attention has been directed toward the creation of porous ceramic membranes with exceedingly small pore size. An example of such research is disclosed in U.S. Pat. No. 5,006,248. Similar work is described in Anderson et al., *Journal of Membrane Science*, 39, pp. 243-458 (1988). The process described in the above patent enables the creation of porous ceramic membranes with small pore sizes, either as supported or unsupported materials. Practical utility of ceramic membranes requires large, thin, crack-free surfaces which can be difficult to reliably make in the unsupported form due to the frailty of the ceramic material. Therefore, supported membranes are more practical for most applications. Traditionally, the accretion or layering of such very small size ceramic particles onto a porous substrate has turned out not to be a trivial endeavor. Such particles tend to accrete, or deposit, on a substrate in an irregular manner resulting in nonhomogeneous thickness. The pores of the substrate which the microporous membrane must span are much larger than the colloidal particles which make up the membrane itself. In addition, the surface topography and electrochemical character of the substrate can adversely effect the deposition of the particles in the accumulating membrane on the substrate. Since the object of depositing such a membrane on a porous substrate is to create a material which can be used for filtering, a highly uniform size distribution of pores in the resulting porous ceramic membrane and a thin, uniform thickness of the membrane are desired.

Metal oxide ceramic membranes of transition metals can also be used for catalytic purposes. U.S. Pat. No. 5,035,784 describes how such materials can be used under ultraviolet light to degrade polychlorinated organic chemicals. Doping can be utilized in mixed membrane materials to increase electrical conductivity for various catalytic purposes. U.S. Pat. No. 5,028,568 describes the doping of titanium membranes with niobium to achieve increased electrical conductivity.

SUMMARY OF THE INVENTION

The present invention is summarized in that a microporous membrane is formed on a porous substrate by passing a dilute colloidal suspension of metal oxide particles through one side of a porous support and evaporating solvent from the suspension by means of gas flow on the opposite side of the porous support, so as to deposit the particles in the colloidal suspension as a gel among the pores on the opposite side of the porous support, followed by careful drying of the gel to form a xerogel sintering of the xerogel to create a porous metal oxide ceramic membrane.

It is an object of the present invention to enable the reliable and convenient construction of a microporous metal oxide ceramic membrane which is useful for very critical filtration operations, such as ultrafiltration, reverse osmosis, and molecular sieving. The membranes may also be used in ceramic membrane reactors and catalytic systems.

It is a feature of the present invention in that it allows the efficient reproducible and reliable production of microporous metal oxide ceramic membranes useful for such purposes.

It is another object of the present invention in that it does not involve difficult or costly equipment and can be readily adapted for most manufacturing operations.

Other objects, advantages and features of the present invention will become apparent from the following specification when taken in conjunction with the accompanying drawings.

DETAILED DESCRIPTION OF THE INVENTION

The present method is directed toward the creation of a microporous metal oxide particulate ceramic membrane on a porous support surface. The process by which the particles forming the microporous ceramic membrane is deposited on the substrate is referred to here as permformation. The term permformation is a coined term, combining "formation" with "permeation," to describe the process by which the particles ultimately forming the membrane are deposited on the support. In its most general terms, a colloidal suspension or sol of metal or metal oxide particles is passed through a porous support. On the far side of the porous support a gas stream causes the deposition of the particles in the pores of the support and the evaporation of the solvent. Capillary action continues to draw the colloidal suspension into the support as the solvent evaporates. The result is the deposition of a layer of colloidal particles in the pores of and/or on the surface of the porous substrate, adjacent to the interface where the gas stream is causing the solvent to evaporate. This process of preferential deposition allows one to directly control the thickness of the resulting gel film, by varying the concentration of the sol and the rate of evaporation of the solvent, by controlling the temperature and relative humidity of the drying gas. If the structure of the porous support is isotropic, the thickness of the gel will be uniform within the entire drying surface, and the thickness can further be controlled by the length of time that the process is performed. Subsequent controlled drying of the deposited gel film particles in the face of the porous support, and firing of the gel, can lead to a crack-free ceramic membrane of uniform thickness and of uniform porosity in a reproducible, reliable and efficient manner.

Figure 1:
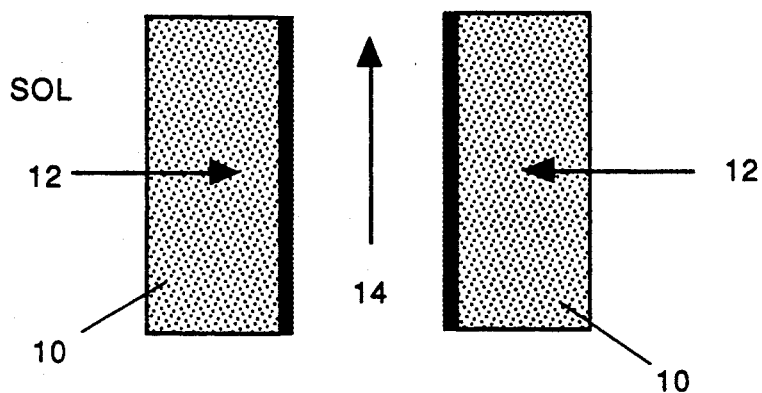
FIG. 1 is a schematic illustration illustrating the concept of the process of the present invention.

FIG. 1 illustrates the general concept of permformation. The dilute sol is placed on a first side of the porous support indicated at 10 in FIG. 1. The porous support 10 is, in the first embodiment described herein, a hollow cylinder. Since a section of the porous support 10 is viewed in cross-section in FIG. 1, two opposite sections of the support are visible, with the sol located on the outside of the support and the gas stream passing vertically in the hollow center. The dilute sol is drawn by capillary flow, indicated by the arrow 12, through the porous support. On the opposite side of the porous support, in its center, a flow of a gas stream is directed as indicated at 14. The gas stream can be a drying gas such as a stream of air or, to prevent unavoidable reactions, an inert gas such as nitrogen, or one of the noble gases. The gas stream can also be a stream of a reactive gas, such as $H_2S$ or $NH_3$, which would also cause deposition of the metal particles as well as evaporation of the solvent. The gas stream and the vapor from the solvent is exhausted and the particles remaining from the dilute sol are deposited in and on the far face of the porous support. As indicated in FIG. 1, which is a cross-sectional view of a porous tube used as a support, the membrane may be deposited on both interior surfaces of the cylindrical porous support.

Figure 2:
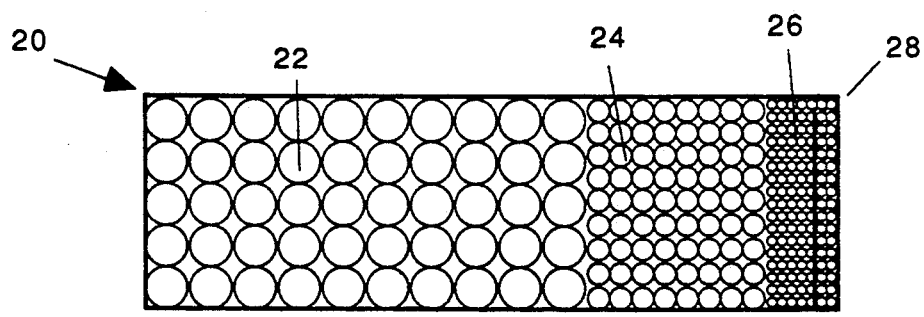
FIG. 2 is another schematic illustration of the concept of the process of the present invention.

Illustrated in FIG. 2 is a detailed schematic diagram intended to convey the conceptual context of the permformation ceramic membrane product made by the present invention as used with a particular support. The method is intended to deposit a microporous membrane on one surface of a support which is already porous.

The cylindrical porous support which has been utilized for the examples described below is itself composed of several layers of particulate materials, which have been sintered into a unitary material. In this example, the support material is made of alumina particles which have been slip-cast in a series of layers of particles of varying size. The particular porous support used is formed of three layers of alpha-alumina of varying size ranges. This porous support is indicated at 20 in FIG. 2. This porous support is available as a cylindrical assembly from Alcoa. The alpha-alumina support is composed of three layers of varying particle diameter and pore size. The largest layer has a thickness of 1.6 mm and a pore diameter of between 10 and 15 microns. That layer, referred to as the substrate, is indicated at 22. The second layer, denominated as first intermediate layer 24, is approximately 0.02 mm thick and has a pore diameter of 0.8 microns with a porosity of 40%. The third layer, denominated the second intermediate layer 26 here, is the innermost layer on the tubular support, and consists of a 0.006 mm layer of particles deposited so as to have a 0.2 micron pore diameter therebetween. The porosity of this layer is approximately 35%. It is the object of the present invention to deposit an even finer layer of microporous ceramic material on such a support. The microporous ceramic membrane layer is indicated at 28 in FIG. 2. The microporous ceramic membrane layer 28 is formed within, and perhaps extending to the surface of, the second intermediate layer 26. The microporous membrane 28 can be thought of as a series of very small particles deposited as a matrix or web in the pores of the inner portion of the second intermediate layer 26. The layer 28 thus includes both the particles of the support with 0.8 micron pores therebetween, and the microporous ceramic membrane deposited in the pores to reduce the mean pore size to the range of 5 to 50 Angstroms. It is this ultrafiltration, or reverse osmosis layer 28, which is deposited by the method utilized in the present invention. In general, such a microporous layer may routinely be fabricated to have mean pore sizes less than 100 Angstroms and down as far as 3–5 Angstroms.

While the three-layer alpha-alumina support described below is a particularly advantageous one for use within the practice of the present invention, other porous supports may also be used. Other porous supports which are readily amenable for use in the permformation method includes stainless supports, sintered metal supports, porous glass (such as Vycor), fibrous mats, or one of a line of ceramic filters sold under the Anotec trade name. The porous support thus does not have to itself be formed of sintered particles. While one embodiment here utilizes a cylindrical support, many other physical configurations of the porous support are possible, such as the flat plate in the alternative embodiment. The apparatus for performing the process must be modified, depending on the shape of the support, so that the sol is on one side of the support and the gas stream is on the other side.

There is considerable flexibility available with respect to the chemical composition of the sol which is used within the permformation process described herein. Both aqueous and alcoholic sols may be used in the permformation process described here. In addition, the range of available metals and metal oxides is wide as well. Metal oxide ceramic membranes can be made with titania, zirconia, and other transition metal oxides, as well as silica, alumina, and iron oxides. Colloidal metal particles such as tungsten and silver may also be used.

The size of the colloidal particle is the major factor in determining both the pore size of the permformed membrane. The thickness of the permformed membrane is determined by the particle size, and by the length of time of operation of the process. The Huckel model of an electric double layer "thickness" can be used to estimate the effective size of the particle as a charge, sphere and water. From that size and from the knowledge of the number of metal oxide ions in the sol, the thickness of the resulting xerogel and membrane can be approximated in theory.

In order to maintain preferential deposition of the colloidal particles at the mouth of the support pore, the interactions between the particles and the support walls, and interactions between the particles themselves, must be kept to a minimum until the particles reach the surface where deposition is desired. It is for this reason that a dilute sol may preferably be used in order to minimize interactions between the particles themselves. A sol which is sufficiently dilute such that the average spacing between particles is significantly larger than the size of the particles themselves achieves this objective. Using an orthorhombic (8 nearest neighbor) configuration as a model for the distribution of sol particles within the sol, it is possible to determine the average separation distance between the nearest neighbor particles. For example, the molarity necessary to achieve a required separation distance between the particles has been calculated in the following Table 1. The particle spacing factor is designated "n" and the molarity necessary to achieve an n of 1, 5 or 10 is disclosed for two diameters of particles. The results are given in terms of the molarity necessary to achieve the desired separation of particles to avoid these interactions.

TABLE 1

| | | Molarity of Sol to Achieve Particle Separation | | |
|---|---|---|---|---|
| pH | Diameter of particles (nm) | n = 1 | n = 5 | n = 10 |
| 8 | 25 | 1.4 | 0.011 | 0.0014 |
| 2 | 12 | 12 | 0.098 | 0.012 |

Figure 3:
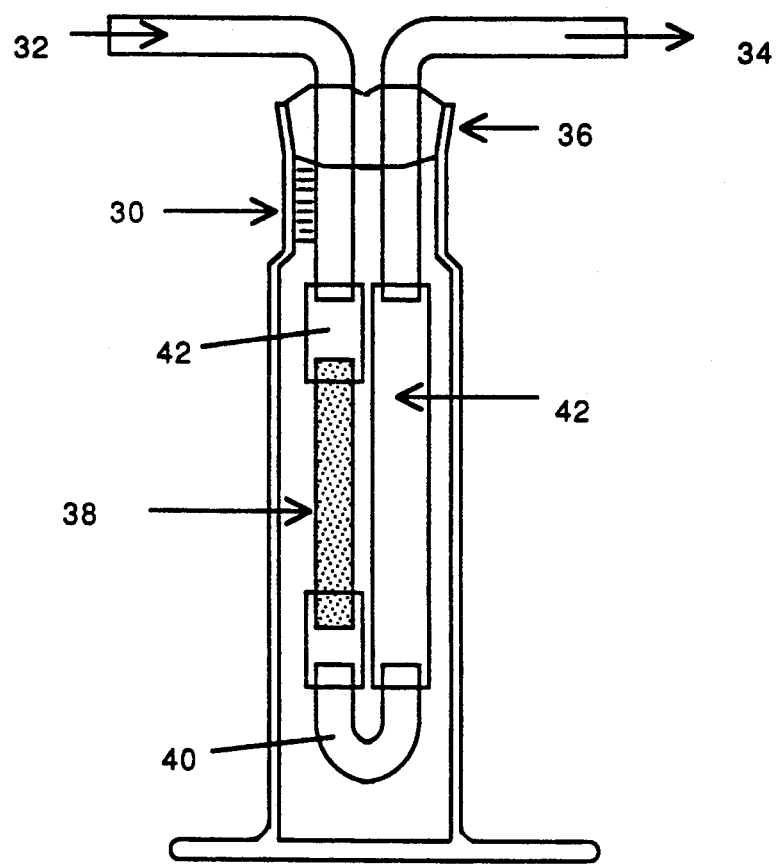
FIG. 3 illustrates one embodiment of an apparatus which may be used to perform the process of the present invention.

Shown in FIG. 3 is a first embodiment apparatus useful for performing the permformation in accordance with the present invention. In FIG. 3, the reaction vessel is indicated at 30. A gas stream enters through an input port 32 and the gas stream exits, together with the vapor of the solvent, at an exit port 34. A stopper 36 seals the interior of the reaction vessel 30 to the atmosphere. Within the reaction vessel 30, connected to suitable tubing to the input and the output ports, is the cylindrical porous support, indicated at 38. A U-shaped glass fitting 40 is located at the bottom of the apparatus, and pieces of Tygon tubing are indicated at 42, to connect to the input output ports 32 and 34. Tygon is a convenient material, but any tubing impermeable to the solvent will suffice. The appropriate quantity of sol is placed in the reaction vessel 30, filling up the vessel to the neck thereof. To operate the vessel, the gas stream is continually supplied through the input port 32, and exhausted through the output 34, thereby slowly drying down the sol by evaporating the solvent therefrom. As the solvent evaporates, the metal oxide particles are deposited on the inner face of the porous support 38. In this embodiment, the exterior of the cylindrical support 38 serves as the sol side of the support and the interior face of the support acts as the deposition side.

Following the permformation procedure, the deposited gelled colloidal particles must be dried to form a xerogel. This is done by critically slow drying, to remove the remaining solvent contained within the xerogel without cracking it. To reduce the drying rate in the bore of the support, i.e. at the gel surface, the configuration of the permformation may be reversed. The glass U-tube 42 at the bottom of the apparatus is filled with solvent, and the inlet and outlet ports 32 and 34 are then sealed. This procedure is intended to result in a 100% relative humidity environment inside the drying loop. The sol reservoir is then emptied, and left open to ambient humidity conditions. The relative humidity gradient thus imposed across the wall of the support is the reverse from that experienced during the permformation process. This relative humidity gradient imposed across the support causes the meniscus of the sol to recede toward the outer surface of the support. A typical drying time would be one to two days.

The dried xerogels can then be fired in ambient air conditions. Firing conditions for the supported membranes typically involve a relatively gradual heating rate of 2° C. per minute until a maximum temperature of 400° C. is reached. Previously experiments have indicated that using mixed metal oxide ceramic membranes, firing temperatures of up to 600° C. can be used for some membranes, though typically firing ranges between 400° and 600° C. are common. The tube is maintained at the peak firing temperature for a time period, typically four hours, and then is cooled to room temperature again in a controlled rate of dissent of approximately 2° C. per minute.

The result of such a process is a microporous metal oxide ceramic membrane deposited on the support which gives the material great strength and rigidity. The microporous membrane is actually deposited within the pores of the support and perhaps extending over the deposition side of the support as well. The material thus formed is suitable for fine filtration operations, notably for ultrafiltration, reverse osmosis and molecular sieving. Since the size of the pores can be readily manipulated within a narrow range, by tightly controlling the size of the particles used to form the membrane, permformed membranes can be designed and constructed according to desired specification. Such materials can be used for gas separations, liquid filtrations, and separations of materials from solvents, such as desalination of sea water. The materials can also be used in catalytic membrane reactors and for catalysis in general.

Figure 4:
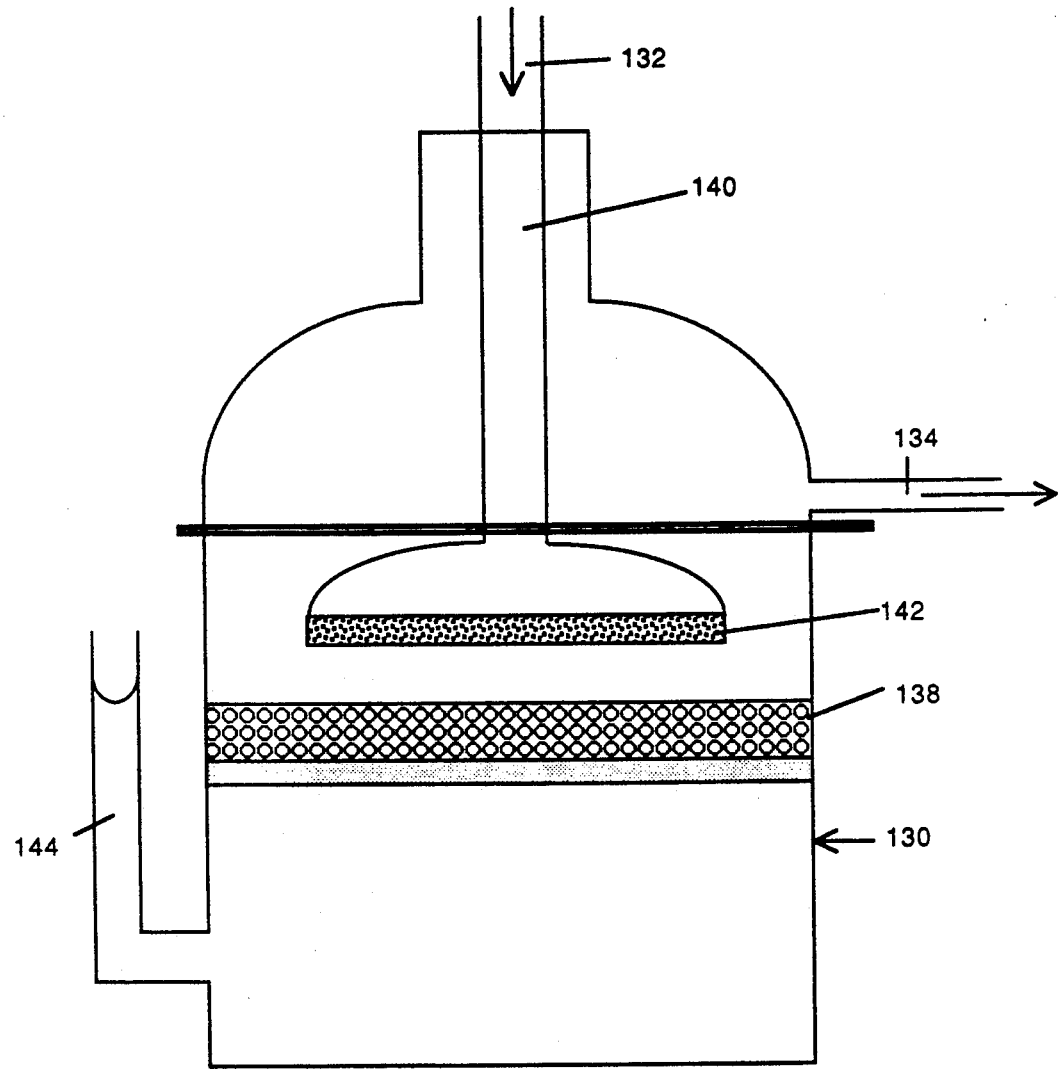
FIG. 4 illustrates another embodiment of an apparatus which may used to perform the process of the present invention.

Other embodiments of the apparatus for performing the process are also possible. For example, a variant of the reactor of FIG. 3 has been assembled in which the cylindrical porous support 38 is oriented horizontally rather than vertically, so that fluid pressure drop differences over the support are minimized. Also, shown in FIG. 4 is an alternative apparatus for performing the same process with a flat disk-shaped porous support. In the apparatus of FIG. 4, the reaction vessel is indicated at 130. The input gas stream enters through input port 132 and exits through output port 134. The porous support, in this case a porous clay ceramic disk, is indicated at 138. The input gas stream passes through flared tubing 140 until it exits through a glass frit 142 so as to be diffused over the top surface of the support 138. The sol is placed in the reaction chamber 130 which is filled until the bottom of the support is touched by the sol. A graduated leveling chamber 144 permit the sol level to be measured and provides an inlet to add more sol if desired.

In operation, the apparatus of FIG. 4 functions analogously to the apparatus of FIG. 3. The input air stream contacts the upper or deposition side of the support. The sol contacts the lower, or sol, side of the support and is drawn into the support by capillary action. The air stream evaporates solvent on the deposition side of the support thereby depositing the colloidal particles as a gel in the interstices of the support.

It is also envisioned that manipulation of the porous support and/or the gas stream may be appropriate in some instances to achieve good membrane formation at the desired location. Since the sol enters the support from the sol side, care must be taken to prevent deposition of the particles until they reach the deposition side. Therefore charge attractions between the support and the particles must be minimized. Additional dilution of the sol may also help with this problem. Once support-to-particle attraction is minimized through the support, care must be taken to ensure that deposition occurs as desired on the deposition side. Phosphate treatment of the deposition side may aid in forming charge attraction at that face. The gas stream can include a reactive gas, such as H2S or NH3, which would change the pH of the sol at the deposition face and thus accelerate deposition of particles. The gas stream could be heated to destabilize the particles in the colloid kinetically to induce deposition. Any or all of these techniques may aid in obtaining better particle deposition preferentially on the deposition side of the support.

EXAMPLES

The Formation of an Iron Sol

The fabrication of a microporous supported ceramic membrane was begun with the consensus of a metal oxide colloidal solution or sol. The fabrication of an iron oxide ceramic membrane was begun with goethite, which was synthesized from ACS reagent grade chemicals and Milli-Q deionized water. To synthesize the goethite, a solution of ferric nitrate (125 ml, 0.83M) was passed through a glass microfiber filter to remove dust and undissolved particulates. The ferric nitrate was then partially neutralized by adding NaOH (41.6 ml, 5M) with rapid stirring. The OH to Fe ratio was calculated to be 2.0. Following some initial precipitation, the ferric nitrate solution resolubilized after about 30 minutes. The ferric nitrate solution was then aged in a shaker at 25° C. in a glass container for 60 hours. After aging, the pH of the solution was 1.4. The partially neutralized ferric nitrate solution was then hydrolyzed by the addition of NaOH (30.2 ml, 5M), which was added over a 3 minute period in a polypropylene container with vigorous stirring by a Teflon impeller. The pH of the iron solution was thus increased to 12.6 in about 3 minutes. The hydrolyzed iron solution was then aged in a shaker at 60° C. for 6 days. Initially, the color of the iron solution was a dark reddish brown, but after 24 hours in the aging period, the color changed to a light, orange-tan which is indicative of the formation of goethite (FeOOH) particles. Excess electrolytes removed from goethite sol by repeated washings with Milli-Q water followed by settling and decanting. The washing was continued until no further decrease in the conductivity of the supernatant could be detected. The goethite sol was then ready for use in the permformation procedure.

EXAMPLE 2

The Formation of Silica Sol

An aqueous silica sol was synthesized from ACS reagent grey chemicals in Milli-Q deionized water. The process was begun with 4.5 ml of tetraethyl orthosilicate (TEOS) which was added drop-wise to NH4OH solution (31 ml, 0.5M) with rapid stirring. Initially, a two-phase mixture was formed, but after stirring for 1 hour the solution became a homogenous silica sol. The sol was transferred to a dialysis membrane (3500 molecular weight cut off) to remove ammonium ion and ethanol which had been formed during hydrolysis. The sol was dialyzed against Milli-Q water until the pH of the sol dropped to below 9. The purified sol was then filtered using glass microfiber paper to remove any dust or particulates. The aqueous silica sol was then ready for use in the permformation procedure.

Formation of Membranes

Both the silica and iron membranes were formed in the apparatus of FIG. 3. The sol was placed inside of the reaction vessel 30. The assembly including the input port and output ports 32 and 34, the porous support 38, the U-shaped fitting 40 and the Tygon tubing 42 was placed as a unit into the reaction vessel, with the stopper 36 sealing the vessel to the atmosphere. A seal was made between the Tygon and the porous ceramic using epoxy resin. Where the ends of the ceramic support were glass-glazed, the epoxy sealant was not used.

A length of nylon thread was inserted between the stopper and the cylinder in the neck to allow pressure equalization as the sol level dropped. In order to minimize subsequent loss of vapor through the neck of the reaction vessel, a paraffin film was wrapped around the stopper joint.

High purity nitrogen gas was used as the drying medium. The nitrogen cylinder the regulator were attached to the inlet port 32 by a length of Tygon tubing. On the output port 34, 2 humidity indicator cards served as a rough estimate of the humidity of the gas flow stream relevant to ambient conditions.

The length of the permformation operation was determined by measuring the decrease in sol level over time. An average sol evaporation rate was calculated as the change in volume over time for each time period. Based on models of the support pore structure, and the packing of the colloidal particles during gelation, an approximate membrane thickness was calculated. Tables 2 and 3 below set forth the results achieved with the silica sol when deposited through the permformation procedure. The first run was conducted with a highly dilute silica sol (separation factor of 20). The run lasted 27 hours and was intended to produce a 3 micron thick membrane. The second run was conducted with a more concentrated sol (separation factor of 10) and was intended to produce a membrane with a thickness of 8 microns.

TABLE 2

| | Dilute Silica Sol | | |
|---|---|---|---|
| Time | Level of sol (mm) | Rate of deposition (ml/hr) | Thickness ($\mu$m) |
| 0.0 | 42 | | |
| 16.5 | 25 | 0.84 | 2.1 |
| 20.75 | 20.5 | 0.86 | 2.6 |
| 26.5 | 15.0 | 0.78 | 3.3 |

TABLE 3

| Time | Concentrated Silica Sol Level of sol (mm) | Rate of deposition (ml/hr) | Thickness (μm) |
|---|---|---|---|
| 0 | 39 | — | 0 |
| 2 | 37 | 0.82 | 0.5 |
| 22 | 25 | 0.49 | 3.6 |
| 24 | 23.5 | 0.61 | 4.0 |
| 32.5 | 19 | 0.43 | 5.2 |
| 45 | 12.5 | 0.42 | 6.8 |
| 51.5 | 9 | 0.44 | 7.7 |

Following the permformation procedure, the gelled colloidal particles were dried to a xerogel and fired to create the sintered porous ceramic membrane. The drying step must be done carefully to avoid gel cracking which can be caused by evaporative stress. To reduce the drying rate in the bore of the support, the configuration of the permformer was reversed. The glass-tube was filled with water and the inlet and outlet ports 32 and 34 were sealed. This resulted in a 100% humidity environment inside of the drying loop. The sol reservoir was then emptied and left open to ambient humidity conditions. The relative humidity gradient imposed across the wall of support caused the meniscus of the sol to recede toward the bore surface of the support. Typical drying times were 1 to 2 days. After the membranes were dried, the end seals were removed using a diamond saw.

The resulting dried xerogels were fired in the ambient air. The firing conditions were controlled so that the heating and cooling ramps were 2° C. per minute and with a maximum firing temperature of 400° C. which was held for a duration of 4 hours.

One indication of the successful deposition of the small colloidal particles in the porous support is that the rate of flow of sol through the support decreases over time. It has been found that the rate of flow of sol, as indicated by the rate of solvent evaporation, does decrease over the time of the permformation. The following Table 4 sets forth the decreasing rate of flow measured for a silica sol being deposited in the cylindrical gamma-alumina support.

TABLE 4

| Cumulative Time of Run (min) | Drop in Sol Level (ml) | Incremental Evaporation Rate (ml/hr) | Overall Evaporation Rate (ml/hr) |
|---|---|---|---|
| 0 | .15 | — | — |
| 14 | .43 | 1.20 | 1.20 |
| 29 | .76 | 1.32 | 1.26 |
| 60 | 1.23 | .91 | 1.08 |
| 109 | 1.80 | .70 | .91 |
| 133 | 2.00 | .50 | .83 |
| 225 | 2.60 | .39 | .65 |
| 386 | 3.52 | .34 | .52 |
| 438 | 3.80 | .32 | .50 |

It is expected that the microporous ceramic membranes will have mean pore sizes adjustable in the range of from 5 to 100 Angstroms. Because the membranes are being formed in the pores of a support, overall porosites will be low, typically less than 30%. Microporous membranes with pores less than 100 Angstroms may be used for ultrafiltration while microporous membranes with pore sizes in the 5–30 Angstrom range may be used for reverse osmosis and molecular sieving. Because of the durability of ceramic materials, the membranes should withstand significant pressure drops and be useful for industrial applications.

We claim:
1. A method of preparing a microporous metal oxide ceramic membrane on a porous support with two sides comprising the steps of
    (a) making a colloidal non-polymeric suspension of metal or metal oxide colloidal particles in a solvent;
    (b) exposing the colloidal suspension to one side of the porous support under conditions so that the suspension is drawn by capillary action into the porous support;
    (c) exposing the other side of the support to a gas stream gas under conditions favoring evaporation of the solvent in the colloidal suspension so that a gel layer of metal oxide is deposited on said other side of the porous support;
    (d) drying any remaining solvent from the gel layer; and
    (e) firing the support with the gel layer thereon at a temperature sufficient to sinter the gel into a ceramic membrane while maintaining the pores therein.
2. A method as claimed in claim 1 wherein the step of making the suspension of metal oxide particles including hydrolysis of a metal alkoxide.
3. A method as claimed in claim 1 wherein the metal in the metal oxide is silicon.
4. A method as claim in claim 1 wherein the porous support is a hollow cylinder.
5. A method as claimed in claim 1 wherein the porous support is a flat plate.
6. A method as claimed in claim 1 wherein the colloidal suspension is aqueous.
7. A method as claimed in claim 1 wherein the colloidal suspension is alcoholic.
8. A method as claimed in claim 1 wherein the gas stream is a stream of reactive gas selected to cause deposition of the colloidal particles.
9. A method as claimed in claim 1 wherein the gas stream is a drying gas stream of nitrogen.
10. A method as claimed in claim 1 wherein the membrane has a pore size of less than 100 Angstroms.
11. A microporous ceramic membrane deposited on a support by the method of claim 1.
12. The microporous ceramic membrane of claim 11 having a mean pore size less than 100 Angstroms and used for ultrafiltration.
13. The microporous ceramic membrane of claim 11 having a mean pore size less than 30 Angstroms and used for reverse osmosis.
14. A method of preparing a microporous metal oxide ceramic membrane on a porous support with two sides comprising the steps of
    (a) making a colloidal suspension of metal or metal oxide colloidal particles in a solvent;
    (b) exposing the colloidal suspension to one side of the porous support under conditions so that the suspension is drawn by capillary action into the porous support;
    (c) exposing the other side of the support to a gas stream gas under conditions favoring evaporation of the solvent in the colloidal suspension so that a gel layer of metal oxide is desposited on said other side of the porous support;
    (d) drying any remaining solvent from the gel layer by exposing the side of the support with the gel thereon to solvent with the other side of the support exposed to drying conditions to draw solvent through the support away from the gel; and

(e) firing the support with the gel layer thereon at a temperature sufficient to sinter the gel into a ceramic membrane while maintaining the pores therein.

15. A method of permforming a microporous metal oxide ceramic membrane on a porous support comprising the steps of
(a) making a colloidal non-polymeric suspension of metal or metal oxide particles in a solvent;
(b) forming a gas stream passage having a drying side and a sol side and including therein the porous support;
(c) placing the colloidal suspension on the sol side of the gas stream passage;
(d) causing the flow of gas stream on the drying side of the drying gas passage under conditions so as to cause the evaporation of the solvent through the porous support thereby depositing the metal oxide particles on the drying side of the support as a gel;
(e) drying the gel thus produced; and
(f) sintering the gel into a microporous ceramic membrane.

16. A method as claimed in claim 15 wherein the step of making the suspension of metal oxide particles includes hydrolysis of a metal alkoxide.

17. A method as claimed in claim 15 wherein the metal in the metal oxide is silicon.

18. A method as claimed in claim 15 wherein the porous support is a hollow cylinder.

19. A method as claimed in claim 18 wherein the drying side is on the inside of the cylinder.

20. A method as claimed in claim 15 wherein the porous support is a flat plate.

21. A method as claimed in claim 15 wherein the colloidal suspension is aqueous.

22. A method as claimed in claim 15 wherein the colloidal suspension is alcoholic.

23. A method as claimed in claim 15 wherein the gas stream is nitrogen gas.

24. A method as claimed in claim 15 wherein the gas stream is a reactive gas causing deposition of the particles.

25. A method as claimed in claim 16 wherein the membrane has a pore size of less than 100 Angstroms.

26. A microporous ceramic membrane deposited on a support by the method of claim 16.

27. microporous ceramic membrane of claim 26 used for ultrafiltration.

28. The microporous ceramic membrane of claim 26 used for reverse osmosis.

29. A method of performing a microporous metal oxide ceramic membrane on a porous support comprising the steps of
(a) making a colloidal non-polymeric suspension of metal or metal oxide particles in a solvent;
(b) forming a gas stream passage having a drying side and a sol side and including therein the porous support;
(c) placing the colloidal suspension on the sol side of the gas stream passage;
(d) causing the flow of gas stream on the drying side of the drying gas passage under conditions so as to cause the evaporation of the solvent through the porous support thereby depositing the metal oxide particles on the drying side of the support as a gel;
(e) drying the gel thus produced by exposing the dry side of the support to solvent and the sol side of the support exposed to drying conditions to draw solvent through the support away from the gel; and
(f) sintering the gel into a microporous ceramic membrane.

* * * * *